United States Patent [19]

Milburn

[11] Patent Number: 5,280,921
[45] Date of Patent: Jan. 25, 1994

[54] SPORTING FIELD LAYOUT SYSTEM

[76] Inventor: Craig Milburn, 6205 Lullabye La., Zephyrhills, Fla. 33541

[21] Appl. No.: 937,233

[22] Filed: Aug. 28, 1992

[51] Int. Cl.⁵ .......................... A63B 71/00; G01B 3/10
[52] U.S. Cl. ........................................ 273/411; 33/756; 33/759
[58] Field of Search ........................ 273/411, 55 R, 31; 33/456, 756, 759

[56] References Cited

U.S. PATENT DOCUMENTS

| | | | |
|---|---|---|---|
| 464,205 | 12/1891 | Swope | 33/756 |
| 3,039,197 | 6/1962 | Abbott | 273/31 X |
| 4,160,324 | 7/1979 | Dunn | 33/759 |
| 5,036,613 | 8/1991 | Smith | 33/756 X |
| 5,052,693 | 10/1991 | Hicks | 273/336 |

Primary Examiner—William H. Grieb
Attorney, Agent, or Firm—James D. Hall

[57] ABSTRACT

A cable used to mark lines on athletic fields having sections of tubing that locate the particular yard line to run chalk lines from one side of the field to the other.

6 Claims, 3 Drawing Sheets

SPORTING FIELD LAYOUT SYSTEM

This invention is related to a system for lining or marking football, baseball, softball and soccer fields.

Previously, a tape measure and rule book were used to mark such fields. However, it was both inconvenient and time consuming, taking up to 2 to 3 hours, to calculate the distance for each line or mark with the aid of the rule book.

SUMMARY OF THE INVENTION

The system of this invention is an easier method to mark such fields, taking only half an hour, and does so without the need to calculate the distance and to continuously resort to a rule book. This invention uses a cable covered with sections of colored heat tubing that locate the particular yard line or mark to draw the chalk line.

Hence, it is an object of this invention to provide a simple and efficient method and device to mark fields for sports.

DESCRIPTION OF THE PREFERRED EMBODIMENT

The preferred embodiment herein described is not intended to be exhaustive or to limit the invention to the precise form disclosed. It is chosen and described to illustrate the principles of the invention and its application and practical use to enable those skilled in the art to follow its teachings.

Figure 1:
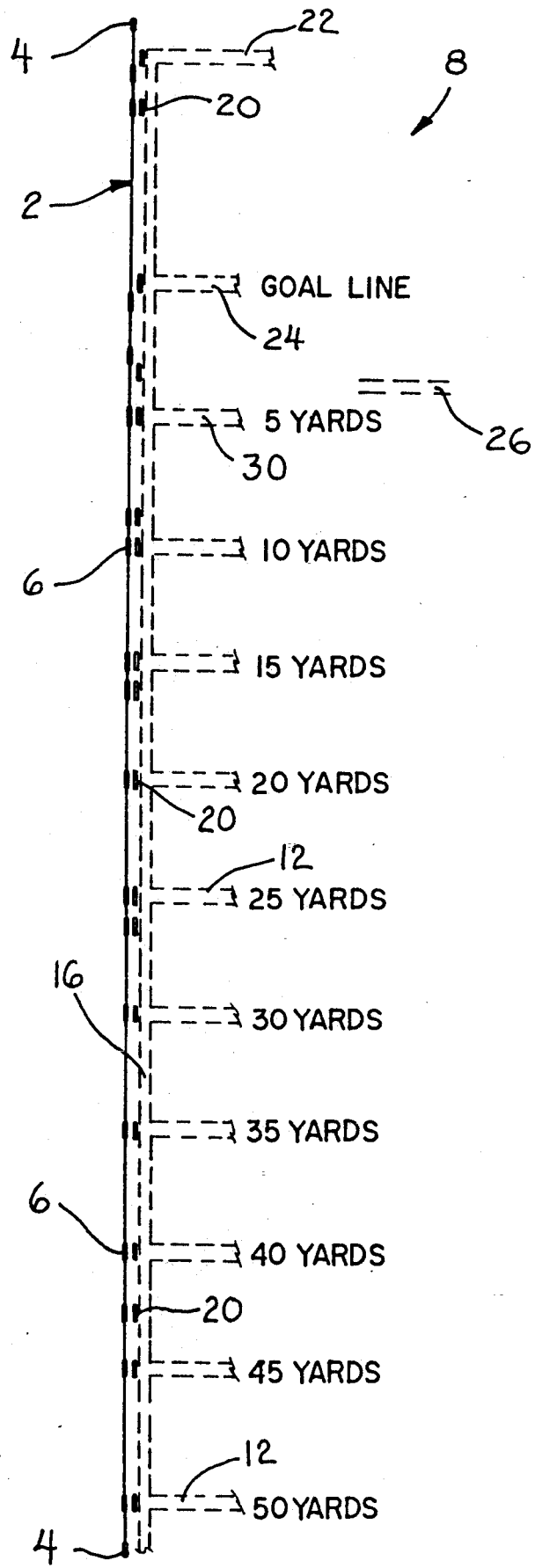
FIG. 1 is a top view of the invent ion in use to line a football field.
Figure 2:
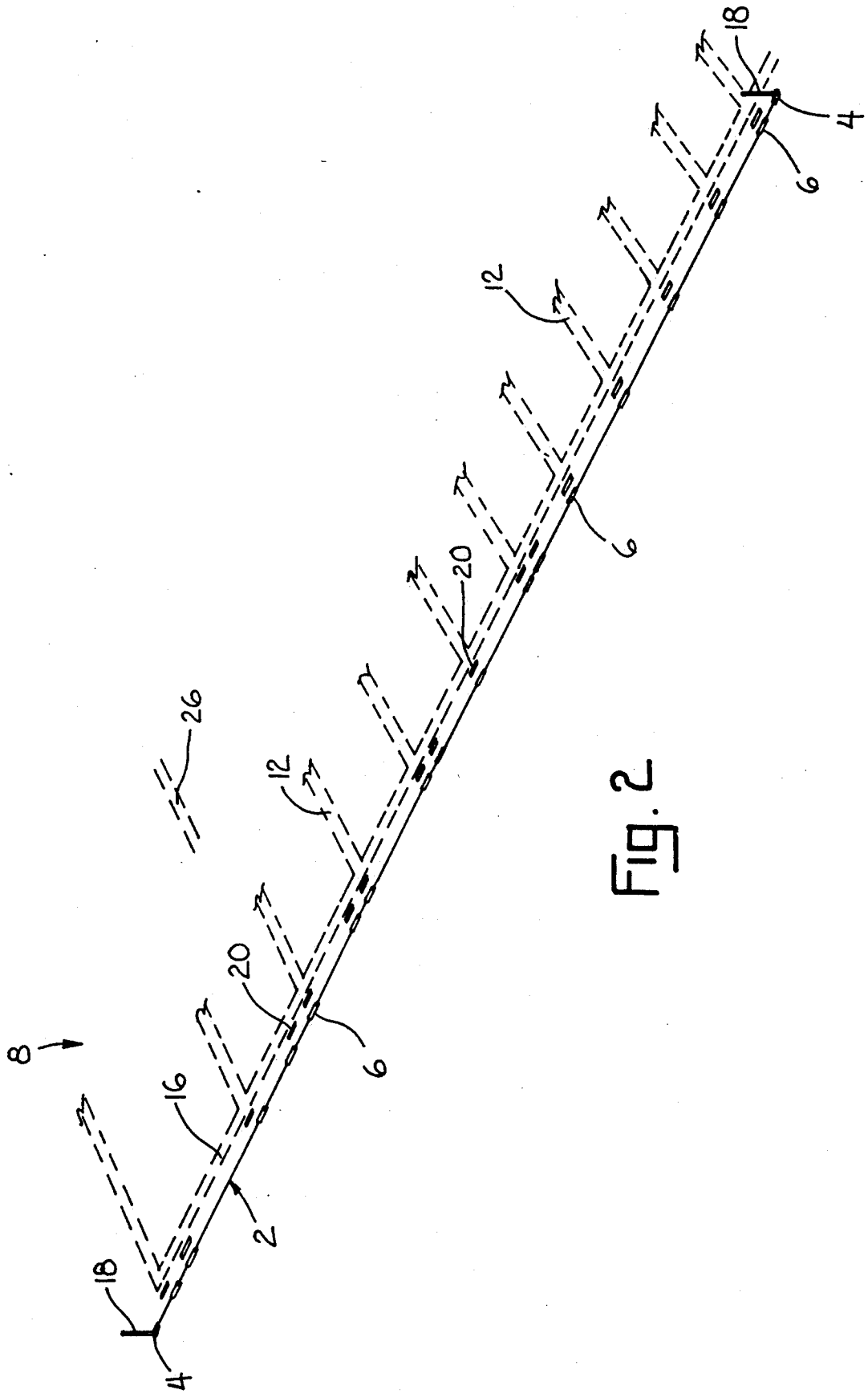
FIG. 2 is a top perspective view of the cable being used on the field.
Figure 4:
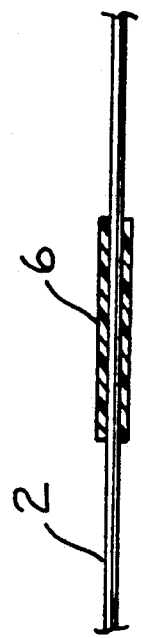
FIG. 4 is a detailed fragmentary view of a marking segment used on the device.
Figure 3:
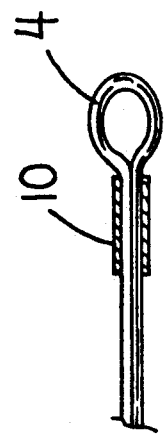
FIG. 3 is a detailed fragmentary view of one end of the device of this invention.

FIGS. 1 and 2 illustrate the use of the device 1 of the invention on a football field 8. A wire cable 2 having looped ends 4 is covered at selected spaced locations with sections 6 of colored tubing. Different colors of the tubing sections 6 are used for indicating the location, in longitudinal orientation along the field, of the end zone 22, goal line 24, extra point 26, yard lines 30 and any other necessary lines. Sections 6 are fixed in location upon cable 2 at distances and spacings corresponding to the distance between and location of the lines to be marked on the field 8. A sleeve 10 is used to form the loop at each end 4 as seen in FIG. 3. The length of the tubes 6 are preferably approximately equal to the widths of the intended aligned lines.

The system of using device 1 is as follows. Cable 2 is first unwound from a cord reel (not shown) and laid along the sideline of field 8 from the end zone to the fifty yard line in a stretched position. A metal stake 18 is inserted through each looped cable end 4 and driven into the ground to retain the cable in its stretched position. Paint, chalk or other type marking material is used to provide alignment segments 20 upon the field adjacent each of the tubing sections 6 indicating where to run the chalk lines across the field. Device 1 is then relocated along the other half of field 8 to mark the remaining sections of the field in a like manner as the first half of the field was lined. Chalk lines 12 are then drawn from one side of field 8 to the other. After use, the cable is rolled up on the cord reel for storage. It should be noted that the device of this invention can be used to mark baseball, softball, soccer and other fields with the number and spacing between tubing section being appropriately revised.

It is understood that the above description does not limit the invention to the given details, but may be modified within the scope of the appended claims.

What I claim is:

1. A device for marking a sporting field comprising:
   cable means for laying along said field in a stretched position;
   multiple spaced marking means located on said cable means for indicating position of indicator lines on said field; and
   retaining means at ends of said cable means for securing said cable means along said field when in said stretched position, each of said marking means being approximately equal to the width of a said indicator line.

2. The device of claim 1 wherein said marking means are of various colors constituting means for indicating specific indicators on said field.

3. The device of claim 1 wherein said marking means is a plurality of spaced tubular members carried by said cable means.

4. The device of claim 3 wherein said cable means has looped ends, said retaining means being a pair of stakes with each stake inserted through a said looped end and into the field.

5. A method for marking a sports field comprising the steps of:
   a) laying out a cable having multiple spaced marking means for determining where indicator lines on said field are to be drawn in a stretched position along said field;
   b) securing said cable to said field to retain the cable in said stretched position; and
   c) using said marking means to form said indicator lines upon said field.

6. A method for marking a sports field comprising the steps of:
   a) laying out a cable in a stretched position on said field, said cable including opposite looped ends and having encircling spaced tubular members for locating the position of said indicator lines on said field;
   b) inserting a pair of stakes into said field with each stake extruding through a looped end to retain said cable in said stretched position;
   c) marking segments on said field at the desired location of said indicators;
   d) removing said cable from said field; and
   e) drawing said indicator lines on said field.

* * * * *